Patented Mar. 26, 1946

2,397,389

UNITED STATES PATENT OFFICE 2,397,389

METHOD FOR BLEACHING SHELLAC

George P. Vincent, Briarcliff Manor, N. Y., assignor to The Mathieson Alkali Works, Inc., New York, N. Y., a corporation of Virginia No Drawing. Application January 12, 1943, Serial No. 472,179

5 Claims. (Cl. 260—107)

This invention relates to the refining of resins. It relates more particularly to an improved process for effecting color improvement or bleaching of resins, and is especially applicable to the bleaching of natural resins, such as shellac, which in their crude state are usually highly colored.

The present invention provides a simple and economical method of bleaching such resins without deleteriously affecting their desired characteristics and without the usual necessary critical control of operating conditions.

I have discovered that such resins may be satisfactorily bleached to a high degree by treatment in the presence of water with a chlorite, in conjunction with a hypochlorite.

In accordance with my present invention, the material to be bleached is subjected to the simultaneous action of a chlorite and a hypochlorite in the presence of water. Advantageously the material to be bleached is admixed with the chlorite and hypochlorite in aqueous solution, the pH of the solution being not less than about 7. In some instances, acidic characteristics of the material being bleached may tend to lower the pH to a point somewhat less than 7. However, in accordance with my invention the addition of extraneous acids is avoided.

The function of the hypochlorite in my improved bleaching process appears to be that of activating the chlorite, rather than a direct action upon the resins. Thus activated the chlorite or reaction products thereof are enabled to effect the bleaching of the resin in an alkaline or substantially neutral environment. The reaction between the chlorite and the hypochlorite may result in the formation of chlorine dioxide ($ClO_2$) but does not result in the production of the more active $Cl_2O$ or free chlorine which are decomposition products of hypochlorites under various conditions.

By my improved process, the chlorite thus activated destroys the coloring matter of the resin but does not attack the resin itself. Accordingly, these resins may be effectively bleached to a high degree without deleteriously affecting them and without the usual necessary careful, critical control of operating conditions.

Chlorites useful in my process are those sufficiently soluble in water to provide an adequate concentration to effect the desired bleaching. Where the bleaching requirement is relatively low, less soluble chlorites may be used. However, for most purposes, I prefer the chlorites of the alkali and alkaline earth metals such as sodium chlorite, $NaClO_2$, and calcium chlorite $Ca(ClO_2)_2$.

Hypochlorites useful in my process are the soluble hypochlorites such as those of the alkali and alkaline earth metals, for instance sodium hypochlorite and calcium hypochlorite.

The temperatures and concentrations employed in my process are not critical and may be varied over a wide range. Increasing the temperature and concentration has generally been found to increase the rate of bleaching. The ratio of chlorite to hypochlorite may also be widely varied.

The optimum operating conditions with respect to temperature, concentration and ratio of chlorite to hypochlorite are to be considerable extent interdependent and will vary with the particular material being bleached, the degree of bleaching required, the length of the period of treatment and, to some extent, with the particular chlorite and hypochlorite used.

The temperature best suited for a particular operation will, to a considerable extent, depend upon the nature of the material being treated. Ordinary room temperature may frequently be employed with advantage, but usually somewhat higher temperatures are desirable. Temperatures at which the particular resin being treated becomes unstable, or is deleteriously effected, are to be avoided.

Though the hydrogen ion concentration of my bleaching solution may be varied over a considerable range, an acid condition of the solution, other than that which may be imparted thereto by the material being treated, is to be avoided, as previously noted. A pH within the range of about 7 to about 10 or 11 may be used with advantage.

Where desirable the pH may be adjusted by the addition of a buffer. Alkali metal phosphates, such as the mono-sodium and di-sodium orthophosphates may be used with particular advantage for the purpose, though other buffers may be used. I have found that in the presence of such phosphates the consumption of chlorite in the bleaching operation is materially reduced.

In carrying out the bleaching operation, the resin, shellac for instance, may be dissolved in an aqueous solution by known methods, as by dissolving the shellac in an aqueous solution of soda ash, the chlorite and hypochlorite admixed therewith, and the resultant solution maintained at a temperature, advantageously about 30–60° C., for a period of time sufficient to effect the desired bleaching. The bleached shellac is thereafter precipitated from the solution.

A particular advantage of my present invention is that a stock bleaching solution may be prepared and used as required, as I have found that an aqueous solution of chlorite and hypochlorite is stable with respect to loss of available chlorine. Accordingly a stock solution may be prepared and kept on hand for considerable time, ready for use as needed. This is of particular convenience as it eliminates the necessity of preparing fresh batches of bleaching solution.

My invention will be further illustrated by the following specific examples of its application:

118 parts of untreated shellac was dissolved in a soda ash solution, containing 11.8 parts of soda ash in 1000 parts of water, by stirring for about 4 hours at 50 to 60° C. Thereafter the solution was filtered to remove foreign matter. With separate portions of this solution there were thoroughly mixed proportions of sodium chlorite and sodium hypochlorite as indicated in the following tabulation. In each instance the treatment was continued at about 40° C. for 3½ hours. At the end of this period each of the separate samples so treated was found to be materially bleached.

In order to precipitate the bleached shellac from the solution, 1 volume of each bleached solution was then diluted to about 8 volumes by the addition of water at 70° C., and 5% sulfuric acid added until the mixture was just acid to litmus. The precipitated shellac was then filtered, washed and spread on trays to dry at 43° C.

An alcohol cut was made of each of the resulting samples by dissolving 20 grams of the sample in 40 c. c. of ethanol. The color of each alcohol cut was a light yellow to orange, as compared with the dark purple color of the solution of unbleached shellac.

Each of the samples was further tested by placing a small handful of shellac on a flat surface heated internally with steam, at about 31 pounds pressure, to a surface temperature of approximately 275° F. (135° C.) and working the shellac with a spatula until it lost its plasticity. The number of minutes required to reach this stage was reported as the "life" of the sample. In the following tabulation, of which the samples of runs C, D, E and F resulted from the foregoing specific illustration, and the samples of runs A and B resulted from the bleaching of a shellac having characteristics somewhat different from that of the foregoing specific example but by substantially identical procedure, the life of the respective samples, together with the treating conditions employed in the respective runs, are recorded.

| Run | Available chlorine present | | | | "Life" test, minutes |
| --- | --- | --- | --- | --- | --- |
| | As OCl⁻, percent | As ClO₂⁻, percent | OCl⁻/ClO₂⁻ | pH | |
| A | 10 | | | | 35 |
| B | 5 | 5 | 1/1 | | 60 |
| C | 10 | | | 9.3-7.9 | 9 |
| D | 5 | 5 | 1/1 | | 13 |
| E | 6⅔ | 3⅓ | 2/1 | 9.5-8.5 | 16 |
| F | 8 | 2 | 4/1 | 9.5-9.0 | 25 |

By my improved process, a high degree of bleaching may be accomplished with economy in time and chemicals while avoiding deleteriously affecting the material being treated and the necessity of critical control of time, temperature and concentrations heretofore required to avoid injuring the material.

I claim:

1. In the bleaching of shellac, the improvement which comprises subjecting the shellac to the action of an aqueous solution of a chlorite of a metal of the group consisting of the alkali and alkaline earth metals and a soluble hypochlorite in the absence of extraneous acids.

2. In the bleaching of shellac, the improvement which comprises subjecting the material to be bleached to the action of an aqueous solution of a chlorite of a metal of the group consisting of the alkali and alkaline earth metals and a soluble hypochlorite at a pH not less than about 7.

3. In the bleaching of shellac, the improvement which comprises admixing the shellac in aqueous solution with a chlorite of a metal of the group consisting of the alkali and alkaline earth metals and a soluble hypochlorite and maintaining the hydrogen ion concentration of the solution at a pH not less than about 7 by the presence of an alkali metal phosphate buffer.

4. In the bleaching of shellac, the improvement which comprises admixing the shellac in aqueous solution with a chlorite of a metal of the group consisting of the alkali and alkaline earth metals and a soluble hypochlorite at a pH not less than about 7.

5. In the bleaching of shellac, the improvement which comprises admixing the shellac in aqueous solution with sodium chlorite in the presence of sodium hypochlorite at a pH not less than about 7.

GEORGE P. VINCENT.